US008312844B2

(12) United States Patent
Mann (10) Patent No.: US 8,312,844 B2
(45) Date of Patent: Nov. 20, 2012

(54) ENDOSKELETAL PET TOY (75) Inventor: Charles D. Mann, Marine on St. Croix, MN (US)

(73) Assignee: Radio Systems Corporation, Knoxville, TN (US)

( * ) Notice: Subject to any disclaimer, the term of this patent is extended or adjusted under 35 U.S.C. 154(b) by 166 days.

(21) Appl. No.: 12/619,553

(22) Filed: Nov. 16, 2009

(65) Prior Publication Data
US 2011/0114031 A1 May 19, 2011

(51) Int. Cl.
*A01K 29/00* (2006.01)

(52) U.S. Cl. .......................................... 119/709; 446/370

(58) Field of Classification Search .......... 119/707–711, 119/702; 446/409, 397, 369, 370, 373, 374, 446/487
See application file for complete search history.

(56) References Cited

U.S. PATENT DOCUMENTS

| | | | |
|---|---|---|---|
| 1,006,182 A | 10/1911 | Cousin | |
| 1,022,112 A | 4/1912 | Smith | |
| 1,031,095 A | 7/1912 | Smith | |
| 1,149,170 A | 8/1915 | Allis | |
| 1,483,165 A | 2/1924 | Eaton | |
| 1,534,964 A | 4/1925 | Kahnweiler | |
| D80,740 S | 1/1930 | Perry | |
| 1,843,864 A | 2/1932 | Burnett | |
| 2,086,631 A | 7/1937 | Munro | |
| 2,194,736 A | 11/1938 | De Bruler | |
| 2,211,330 A | 8/1940 | Hochberg | |
| 2,597,704 A | 5/1952 | Carlson | |
| 2,610,851 A | 9/1952 | Jones | |
| 2,745,214 A | 5/1956 | Lawson | |
| 2,938,727 A | 5/1960 | Nosak | |
| D188,179 S | 6/1960 | Tay | |
| 3,071,476 A | 1/1963 | Werft et al. | |
| 3,073,598 A | 1/1963 | Tiikkainen | |
| 3,104,648 A | 9/1963 | Fisher | |
| 3,107,651 A | 10/1963 | Beck | |
| 3,122,129 A | 2/1964 | Wise | |
| 3,200,537 A | 8/1965 | Glass et al. | |
| D214,928 S | 8/1969 | Swett et al. | |
| 3,481,070 A | 12/1969 | Baulard-Cogan | |
| D219,284 S | 11/1970 | Hunt | |

(Continued)

FOREIGN PATENT DOCUMENTS

CA 2240524 6/1997

(Continued)

OTHER PUBLICATIONS

The Kyjen Company, Plush Puppies, Original Large & Junior Series, advertisement, p. 1 of 1, Aug. 2000.

(Continued)

*Primary Examiner* — Timothy D Collins
*Assistant Examiner* — Brian M O'Hara
(74) *Attorney, Agent, or Firm* — Leanne Taveggia Farrell; Westman, Champlin & Kelly, P.A.

(57) ABSTRACT

A pet toy includes an internal skeletal member having an inner surface and an outer surface. The internal skeletal member is configured to deform upon compression such that opposing sides of the internal surface come into contact with each other. An outer covering surrounds the skeletal member. A sound-emitting squeaker device is located within an internal space of the internal skeletal member. The sound-emitting squeaker device remains free to move throughout the internal space of the internal skeletal member.

17 Claims, 9 Drawing Sheets

U.S. PATENT DOCUMENTS

| | | |
|---|---|---|
| 3,633,587 A | 1/1972 | Hunt |
| 3,664,303 A | 5/1972 | Baensch |
| 3,679,212 A | 7/1972 | Smith |
| 3,785,347 A | 1/1974 | Dinnerstein |
| 3,871,334 A | 3/1975 | Axelrod |
| 3,889,950 A | 6/1975 | Kasravi |
| 3,899,607 A | 8/1975 | Miller et al. |
| 3,908,994 A | 9/1975 | Astrom |
| 3,956,850 A | 5/1976 | Seidenberg |
| 3,964,438 A | 6/1976 | Rodemeyer |
| 4,032,665 A | 6/1977 | Miller et al. |
| 4,067,138 A | 1/1978 | Cederholm et al. |
| 4,124,952 A | 11/1978 | Terzian |
| 4,248,424 A | 2/1981 | Judkins |
| 4,302,901 A | 12/1981 | Psyras |
| D264,364 S | 5/1982 | Pazurek |
| 4,391,064 A | 7/1983 | Lakin et al. |
| 4,513,014 A | 4/1985 | Edwards |
| 4,557,219 A | 12/1985 | Edwards |
| 4,619,625 A | 10/1986 | Seki et al. |
| D287,988 S | 1/1987 | Billinghusrt |
| 4,701,131 A | 10/1987 | Hildebrandt et al. |
| 4,802,444 A | 2/1989 | Markham et al. |
| D307,339 S | 4/1990 | Markham et al. |
| 4,919,083 A | 4/1990 | Axelrod |
| D308,122 S | 5/1990 | Markham et al. |
| 4,936,809 A | 6/1990 | Auer et al. |
| D314,455 S | 2/1991 | Morton |
| 5,025,753 A | 6/1991 | Schneider |
| 5,098,329 A | 3/1992 | Tseng |
| 5,123,378 A | 6/1992 | Bayne |
| 5,158,284 A | 10/1992 | Vogl |
| 5,165,363 A | 11/1992 | McGinty |
| D332,982 S | 2/1993 | Norman et al. |
| 5,207,420 A | 5/1993 | Crawford et al. |
| 5,224,959 A | 7/1993 | Kasper |
| RE34,352 E | 8/1993 | Markham et al. |
| 5,232,130 A | 8/1993 | Woodard |
| 5,234,726 A | 8/1993 | Dahan |
| 5,236,196 A | 8/1993 | Blankenburg et al. |
| 5,263,436 A | 11/1993 | Axelrod |
| 5,269,526 A | 12/1993 | Wollstein |
| D343,262 S | 1/1994 | Axelrod |
| D344,161 S | 2/1994 | Markham |
| D349,786 S | 8/1994 | Markham |
| 5,343,828 A | 9/1994 | Houghton et al. |
| 5,351,652 A | 10/1994 | Budman et al. |
| D357,952 S | 5/1995 | Chen |
| D359,147 S | 6/1995 | Hotta et al. |
| D359,327 S | 6/1995 | Gould |
| 5,421,107 A | 6/1995 | Bryan |
| 5,462,473 A | 10/1995 | Sheller |
| 5,480,143 A | 1/1996 | McMurry |
| 5,536,007 A | 7/1996 | Snyder |
| D373,229 S | 8/1996 | O'Rourke et al. |
| D373,859 S | 9/1996 | Markham et al. |
| 5,553,570 A | 9/1996 | VanNatter, III et al. |
| 5,560,320 A | 10/1996 | Plunk |
| 5,564,369 A | 10/1996 | Barber et al. |
| 5,595,142 A | 1/1997 | Chill |
| 5,619,954 A | 4/1997 | Rotondi |
| 5,640,931 A | 6/1997 | Markham |
| D381,593 S | 7/1997 | Dreyfus et al. |
| D387,513 S | 12/1997 | Mauldin, Jr. |
| D388,559 S | 12/1997 | Mauldin, Jr. |
| D393,110 S | 3/1998 | Mauldin, Jr. |
| 5,799,616 A | 9/1998 | McClung, III |
| 5,800,244 A | 9/1998 | Barton, Jr. |
| 5,807,192 A | 9/1998 | Yamagishi et al. |
| 5,813,366 A | 9/1998 | Mauldin, Jr. |
| D400,620 S | 11/1998 | Barton, Jr. |
| 5,832,877 A | 11/1998 | Markham |
| 5,857,431 A | 1/1999 | Peterson |
| 5,865,146 A | 2/1999 | Markham |
| 5,870,971 A * | 2/1999 | Krietzman et al. ........... 119/707 |
| 5,904,118 A | 5/1999 | Markham |
| D411,335 S | 6/1999 | Hester |
| 5,941,197 A | 8/1999 | Axelrod |
| 5,947,061 A | 9/1999 | Markham et al. |
| 5,965,182 A | 10/1999 | Lindgren |
| 6,003,470 A | 12/1999 | Budman |
| 6,012,997 A | 1/2000 | Mason |
| 6,014,950 A | 1/2000 | Rogers |
| 6,098,571 A | 8/2000 | Axelrod et al. |
| 6,110,001 A | 8/2000 | Chae |
| 6,112,703 A | 9/2000 | Handelsman |
| 6,129,053 A | 10/2000 | Markham et al. |
| 6,142,886 A | 11/2000 | Sullivan et al. |
| 6,186,095 B1 | 2/2001 | Simon |
| 6,190,269 B1 | 2/2001 | Moriyama |
| 6,200,616 B1 | 3/2001 | Axelrod et al. |
| 6,216,640 B1 | 4/2001 | Zelinger |
| D448,138 S | 9/2001 | Gokturk |
| D459,404 S | 6/2002 | Perez |
| 6,403,003 B1 | 6/2002 | Fekete et al. |
| 6,422,912 B1 | 7/2002 | Summers |
| 6,609,944 B1 | 8/2003 | Viola |
| 6,622,659 B2 | 9/2003 | Willinger |
| 6,651,590 B2 | 11/2003 | Willinger et al. |
| 6,663,457 B2 | 12/2003 | Ritchey |
| D489,494 S | 5/2004 | Silverglate |
| D497,191 S | 10/2004 | Shore |
| D514,263 S | 1/2006 | Willinger |
| 7,144,293 B2 | 12/2006 | Mann et al. |
| 7,363,880 B2 * | 4/2008 | Ritchey et al. ................ 119/709 |
| 7,574,977 B2 * | 8/2009 | Ritchey ........................ 119/707 |
| 2001/0039162 A1 | 11/2001 | Sabbagh |
| 2002/0134318 A1 | 9/2002 | Mann et al. |
| 2005/0045115 A1* | 3/2005 | Mann ............................ 119/711 |
| 2007/0062461 A1* | 3/2007 | Lubeck ......................... 119/709 |
| 2008/0176482 A1* | 7/2008 | Li ................................. 446/370 |
| 2009/0318055 A1* | 12/2009 | McCann ....................... 446/370 |

FOREIGN PATENT DOCUMENTS

| | | | |
|---|---|---|---|
| WO | 9925183 A1 | 5/1999 | |

OTHER PUBLICATIONS

The Kyjen Company, Plush Puppies, Bungee Series & Sherpa Crinklers, advertisement, p. 1 of 1, Aug. 2000.

GrabBall Advertisement, p. 1, at least as early as Mar. 28, 2007.

Unleashed Unlimited Dog Training, "Pogo Plush Slap Happy," pp. 1-2, http://unleashedunlimited.com/pogo-plush-slap-happy/ (last visited Jun. 8, 2011).

Unleashed Unlimited Dog Training, "Pogo Plush Ball," pp. 1-2, http://unleashedunlimited.com/pogo-plush-ball/ (last visited Jun. 8, 2011).

* cited by examiner

ENDOSKELETAL PET TOY

BACKGROUND

Non-consumable chewable pet toys provide a variety of beneficial functions for the pet carnivore. Chewing on such toys provides the carnivore with masticatory exercise, as well as dental prophylaxis. Irregular shapes impart erratic movements to the toy when rolled or bounced, thereby providing exercise for the animal. Such toys often provide a training function, teaching the carnivore to chew on the toy, rather than on furniture or other valuable items.

To enhance the attractiveness of the toy to the carnivore, sensory attractants are incorporated into the toy. One attractant commonly employed in chewable pet toys is a noise-producing device that emits a squeak or other attractant sound due to air flowing through the device when the carnivore chews on the toy. Such a noise-producing device is commonly called a "squeaker."

The squeaker is mounted to an internal surface of the toy so that compression of a squeaker chamber within the toy, such as by chewing, forces air through the passage to emit a sound. Upon relaxation of the squeaker chamber, the chamber returns to its relaxed, or inflated, state, drawing air through the squeaker passage and again emitting a sound. In some cases, the squeaker chamber is integral with the toy, although in other cases the squeaker device includes its own chamber. In either case, the squeaker chamber is closed so that the squeaker passage forms the only passage for air into and out of the chamber.

Because the squeaker is mounted to the toy, most carnivorous animals are attracted to the sound from the squeaker to chew on the chew toy at the region of the squeaker device to satisfy their animal instinct to defeat it. Consequently, most animals tend to chew at only the location of the squeaker in the toy, eventually tearing or rupturing the toy at that location. When the toy tears or ruptures at the region of the squeaker, a risk exists that the animal will dislodge the rigid squeaker housing from the toy and will swallow the squeaker, possibly injuring the animal. In addition, if the non-consumable pet toy is a plush toy, stuffing will fall out, causing a mess.

The discussion above is merely provided for general background information and is not intended to be used as an aid in determining the scope of the claimed subject matter.

SUMMARY

Under one embodiment, a pet toy includes an internal skeletal member having an inner surface and an outer surface. The internal skeletal member is configured to deform upon compression such that opposing sides of the internal surface come into contact with each other. An outer covering surrounds the skeletal member. A sound-emitting squeaker device is located within an internal space of the internal skeletal member. The sound-emitting squeaker device remains free to move throughout the internal space of the internal skeletal member.

In another embodiment, the outer covering includes at least two fabric pieces that are secured together by stitching. The fabric pieces are secured together around a periphery of the internal skeletal member with a machine stitch and are secured together around a remaining portion of the periphery adjacent to an access opening in the skeletal member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a sound attractant non-consumable pet toy having characteristics of a plush toy without the need for filling. In particular, the non-consumable pet toy includes an outer fabric covering surrounding an interior skeletal member for housing an unfixed squeaker device.

Figure 1:
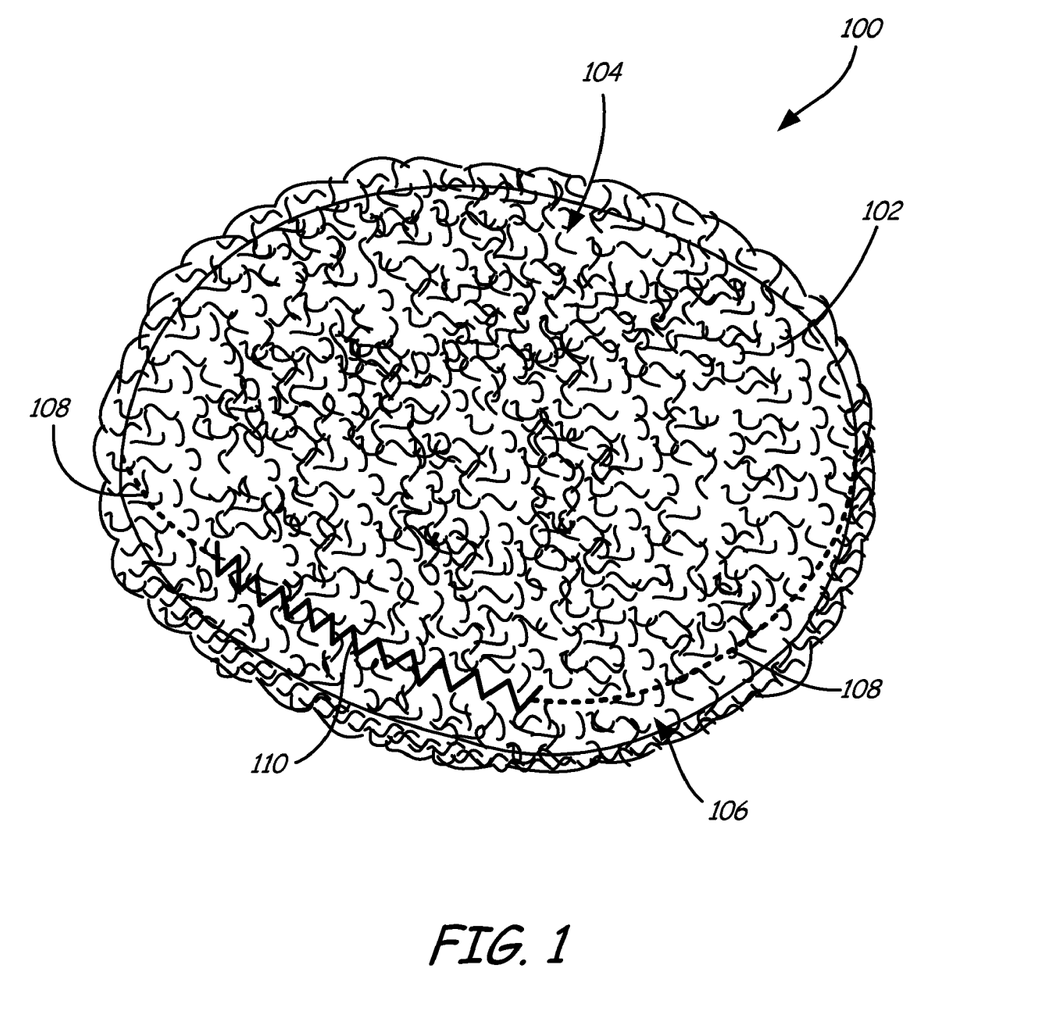
FIG. 1 illustrates a back perspective view of a pet toy under one embodiment.

FIG. 1 is a back perspective view of a pet toy 100 under one embodiment. Pet toy 100 includes an outer covering 102. As illustrated in FIG. 1, outer covering 102 is made of polyester fabric resembling sheepskin, but outer covering 102 can be made of any type of man-made or natural fabric. Examples include wool, cotton, nylon, animal fur, animal hide, cordura, blends or knits and the like. Outer covering 102 includes at least two fabric pieces 104 and 106. However, any number of pieces of fabric can be used to form outer covering 102. As illustrated in FIG. 1, fabric piece 104 is secured to fabric piece 106 by for example stitching. In one embodiment, fabric pieces 104 and 106 are secured together around a portion of the periphery of internal skeletal member 112 with a machine stitch 108 and are secured together around a remaining portion of the periphery of the internal skeletal member 112 by a hand stitch 110.

Figure 2:
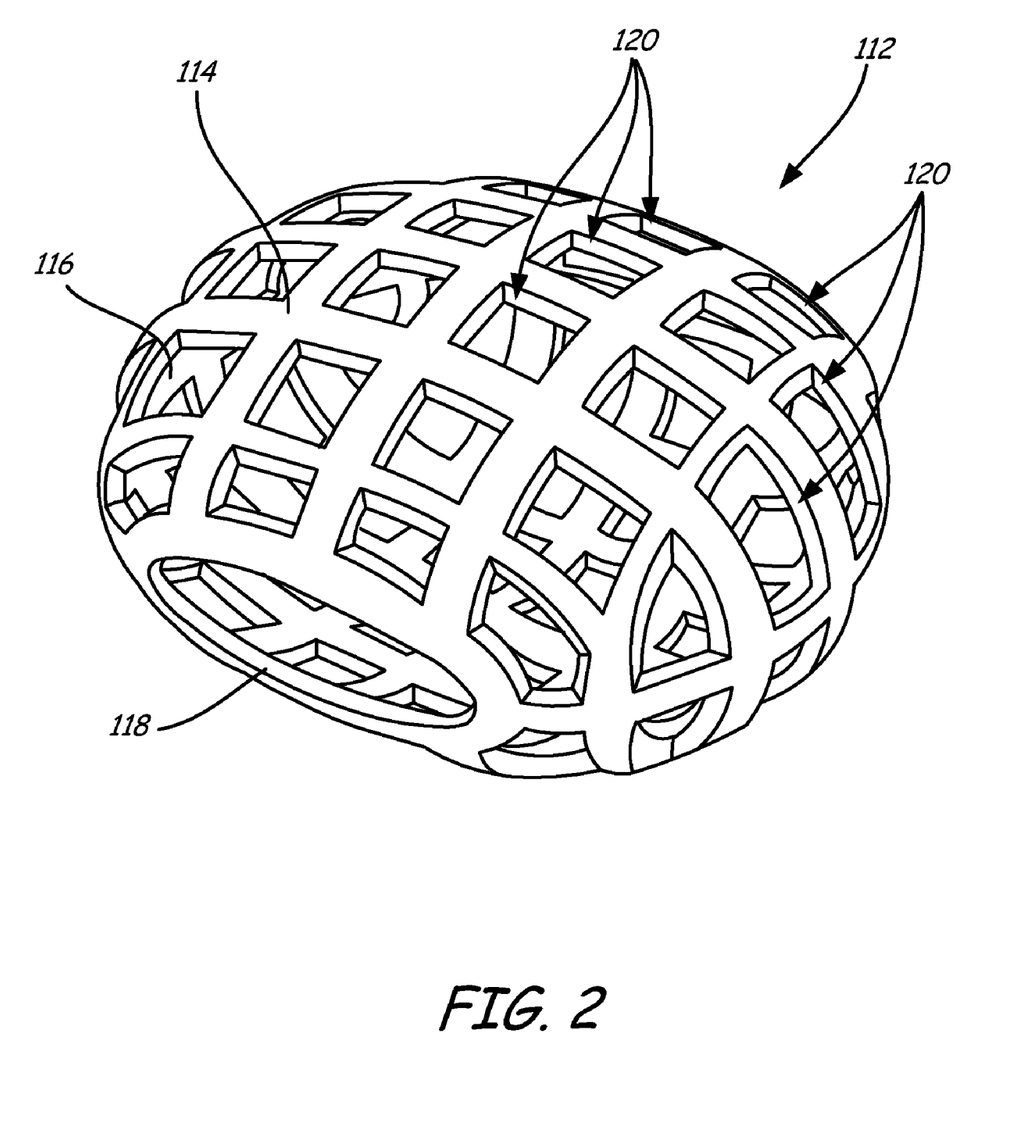
FIG. 2 illustrates a front perspective view of a skeletal member of the pet toy illustrated in FIG. 1.
Figure 3:
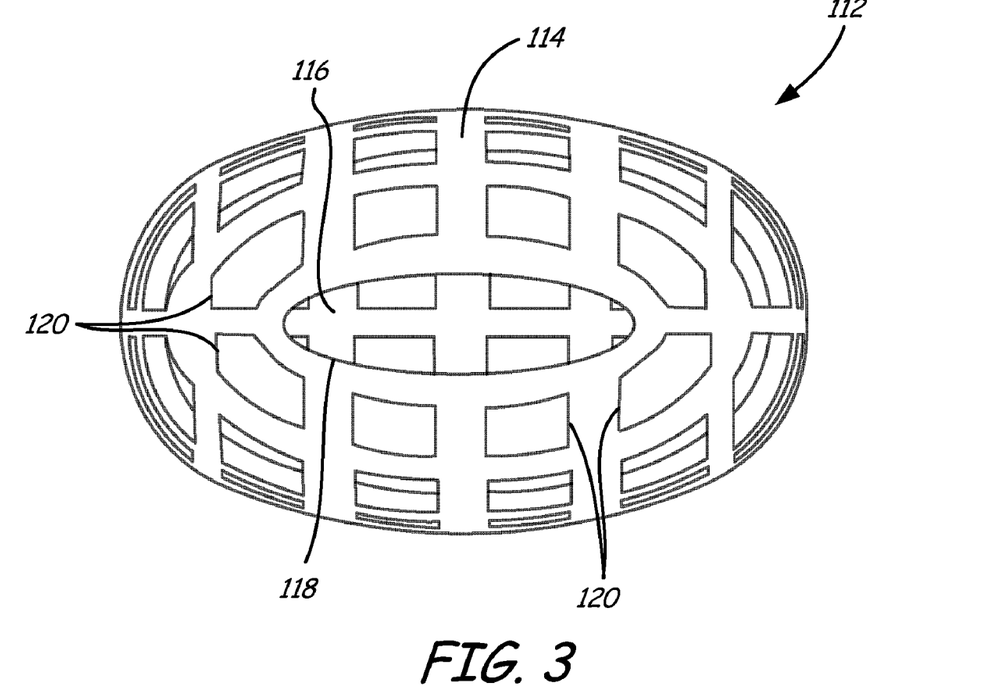
FIG. 3 illustrates a front plan view of the skeletal member illustrated in FIG. 2.
Figure 4:
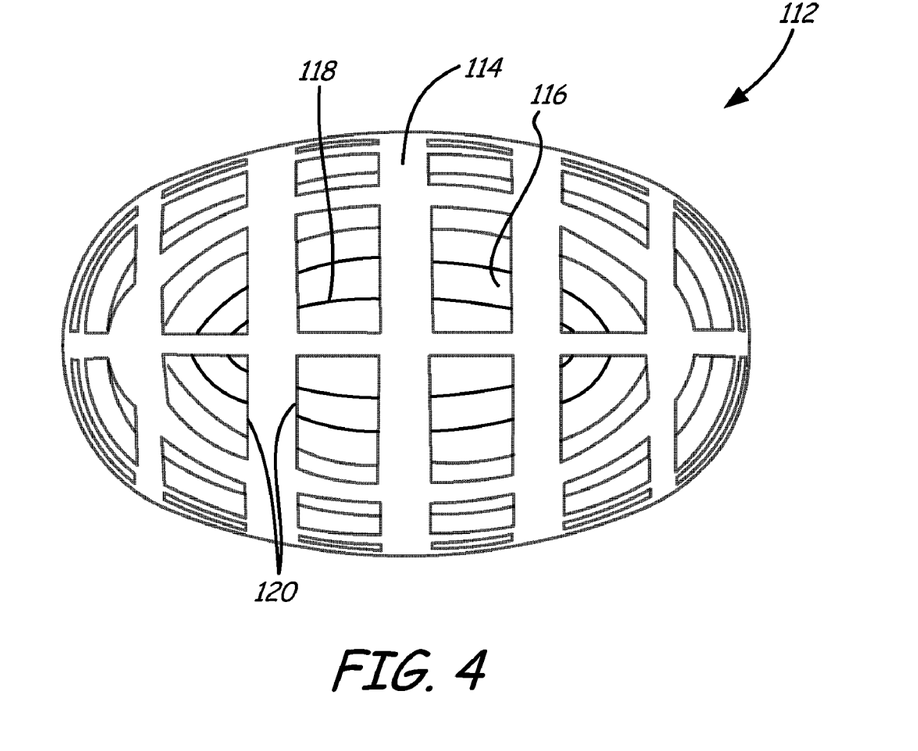
FIG. 4 illustrates a back plan view of the skeletal member illustrated in FIG. 2.
Figure 5:
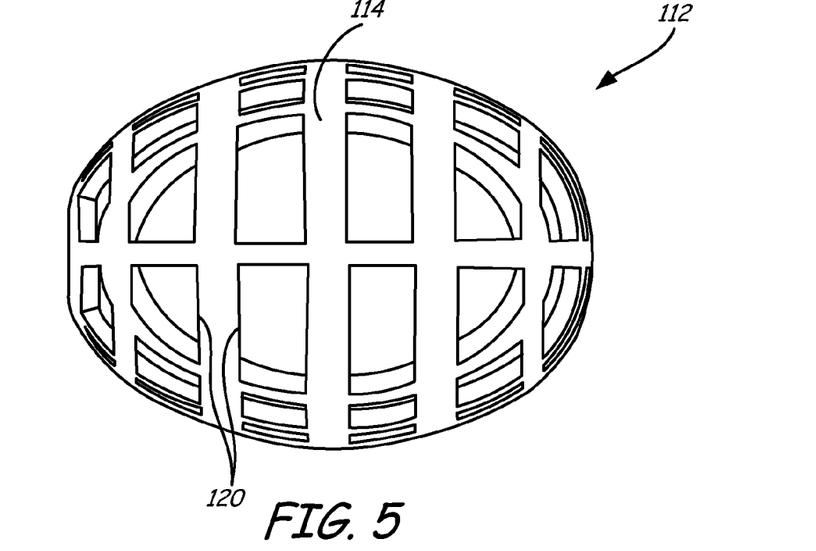
FIG. 5 illustrates a side plan view of the skeletal member illustrated in FIG. 2.

Instead of filling pet toy 100 with filling fabric such that a pet can compress the toy with their jaw, pet toy 100 includes an internal skeletal member 112. FIG. 2 is a front perspective view, FIG. 3 is a front view, FIG. 4 is a back view and FIG. 5 is a side view of the skeletal member 112 that is positioned internal to outer covering 102 illustrated in FIG. 1. Skeletal member 112 is a single, unitary member made of a compressible fabric, such as a compressible or pliable rubber. Skeletal member 112 includes an outer surface 114 and an inner surface 116. Skeletal member 112 includes an access opening 118. Access opening 118 extends from inner surface 116 to outer surface 118 and allows one to insert an object into the internal space of the skeletal member.

Skeletal member 112 also includes a plurality of apertures 120 extending from outer surface 114 to inner surface 116 and having of a variety of different geometries. Although apertures 120 are predominantly of a rectangular geometry, any type of geometry is possible. In FIG. 2, the rectangular apertures form a repetitive pattern of criss-crossing to resemble a lattice frame structure. When skeletal member 112 is positioned within outer covering 102 (FIG. 1), skeletal member 112 provides support for outer covering 102 to maintain a desirable shape. In addition, when applying opposing forces to pet toy 100, such as squeezing or clamping on either side of the pet toy, skeletal member 112 is compressible such that the inner surface 116 of one side of the skeletal member can be compressed to touch or come into contact with the inner surface 116 of the other side of the skeletal member. After the forces on the toy are released, skeletal member 112 reverts to its original form or shape and thereby returns outer covering 102 to its uncompressed state.

Figure 6:
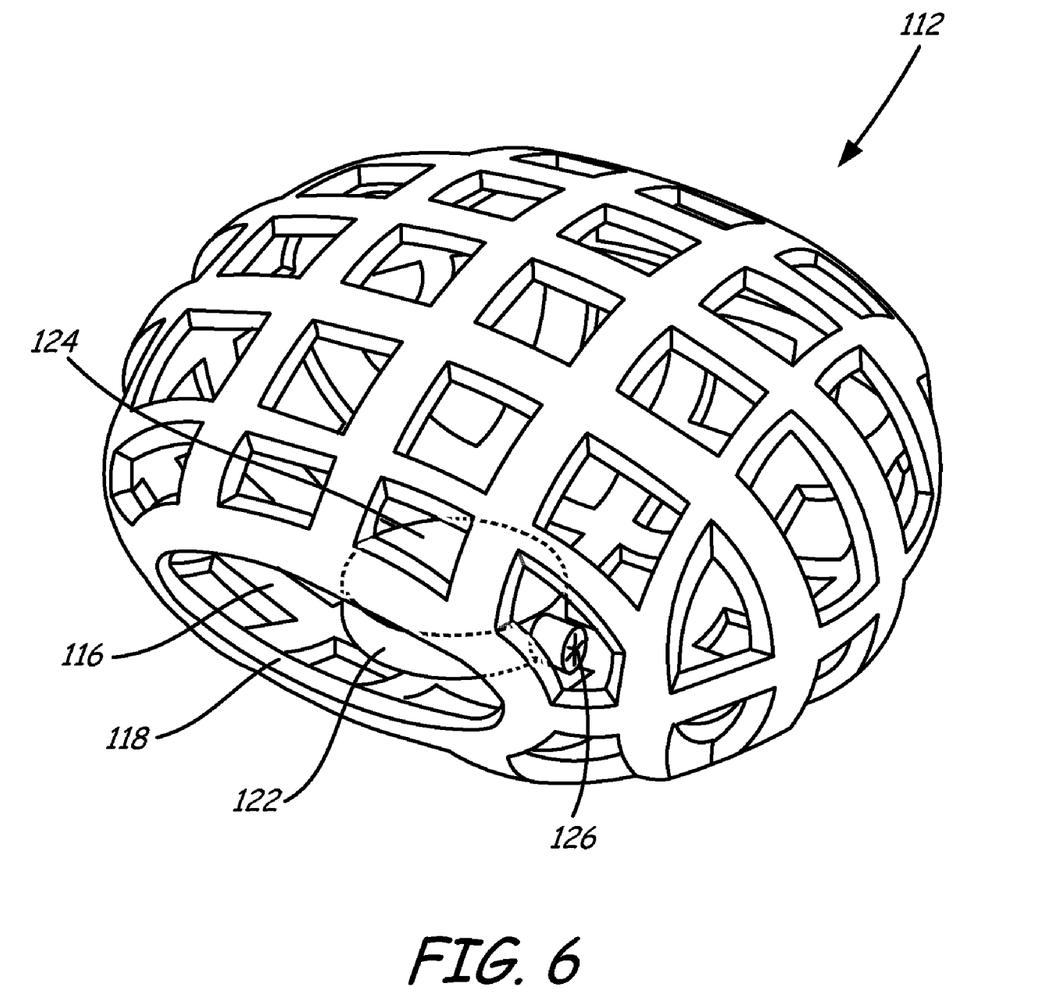
FIG. 6 illustrates a front perspective view of the skeletal member illustrated in FIG. 2 including a squeaker.

FIG. 6 illustrates a front perspective view of skeletal member 112 including a squeaker device 122. Squeaker device 122 comprises a housing 124 having an air passage 126 therein. A reed or other noise-making device (not shown) is placed in passage 124 so that air passing through passage 124 vibrates the reed or otherwise causes device 122 to emit a sound or noise.

Squeaker device 122 is inserted through access opening 118 and is left to be retained within the inner surface 116 of skeletal member 112. Squeaker device 122 is free to move within the internal space of skeletal member 112 and remains unfixed. As previously discussed, carnivorous pets will chew on the same location of a pet toy and specifically at the location of a squeaker. However, because squeaker device 122 is free to move about the internal space of skeletal member 112, the carnivorous pet will not attempt to repeatedly chew on the toy in the same location thereby tearing or rupturing a particular region of the toy.

Figure 7:
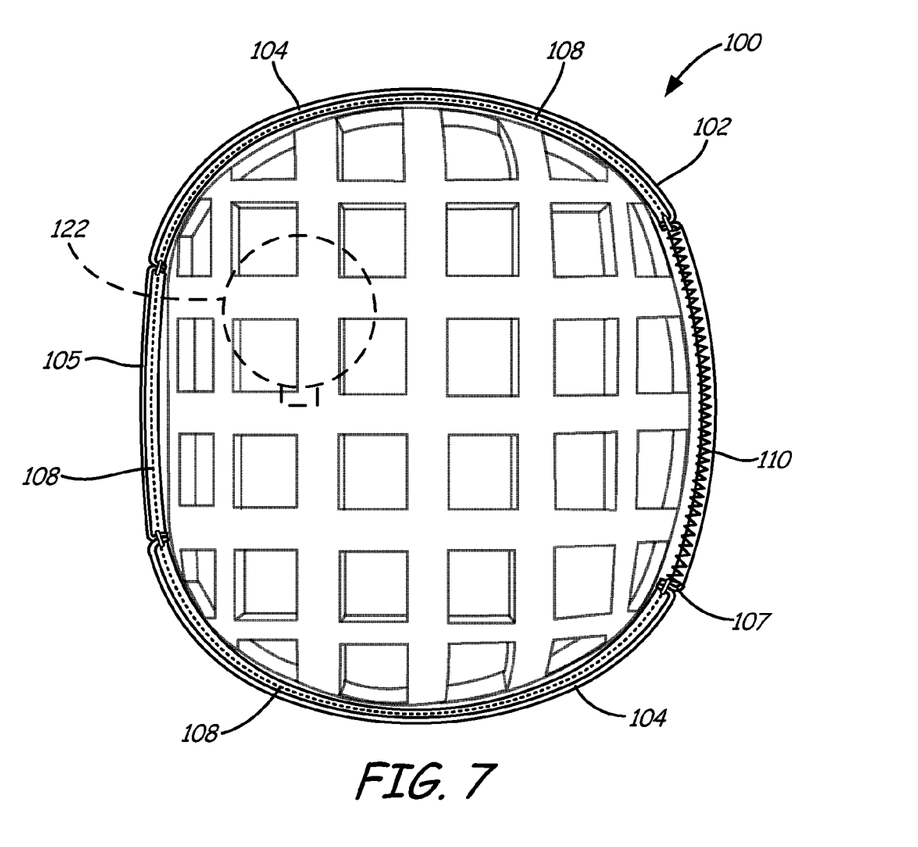
FIG. 7 illustrates a top plan view of the pet toy illustrated in FIG. 1 showing the skeletal member positioned within the outer covering and including the squeaker.
Figure 8:
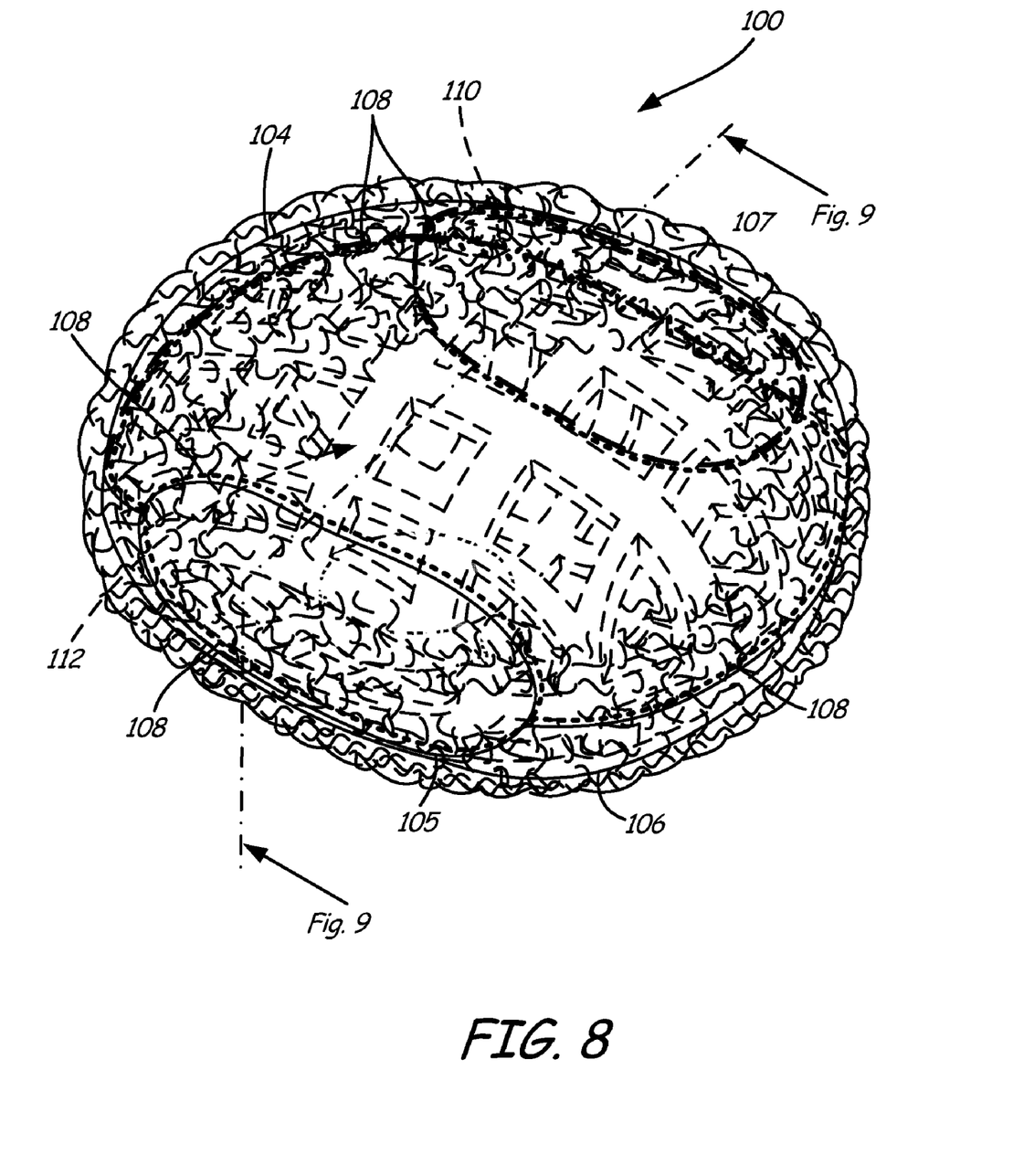
FIG. 8 illustrates a front perspective view of the toy illustrated in FIG. 1 showing the skeletal member positioned within the outer covering and including the squeaker.
Figure 9:
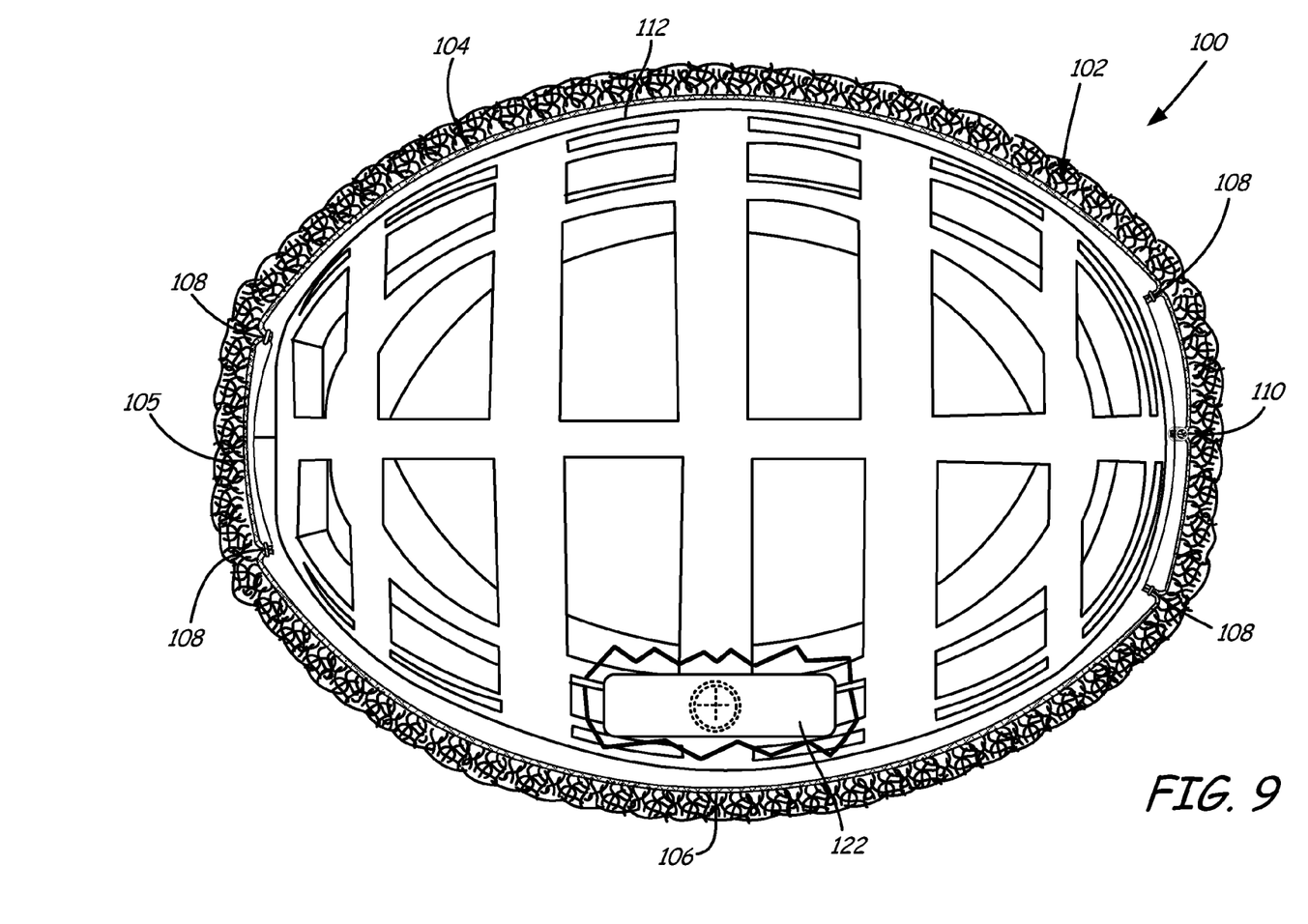
FIG. 9 illustrates a sectional view of the FIG. 8.

FIG. 7 illustrates a top plan view, FIG. 8 illustrates a front perspective view and FIG. 9 illustrates a sectional view of pet toy 100 showing skeletal member 112 positioned within the outer fabric covering 102 and including the squeaker device 122. As illustrated in FIG. 7, three pieces of fabric 104, 105 and 107 are shown, however, in the exemplary embodiment illustrated in FIGS. 1 and 7-9, pet toy 100 actually includes four pieces of fabric 1104, 105, 106 and 107, one of which is hidden from view in FIG. 7 and opposes fabric piece 104.

As illustrated, fabric piece 104 is secured to fabric piece 106, fabric piece 105 is secured to fabric pieces 104 and 106 and fabric piece 107 is secured to fabric pieces 104 and 106 by, for example, stitching. In one embodiment, fabric pieces 104, 106, 105 and 107 are secured together around a portion of the periphery of internal skeletal member 112 with a machine stitch 108. While an opening in fabric piece 107 is secured together around a remaining portion of the periphery of the internal skeletal member 112 by a hand stitch 110. As illustrated, machine stitch 110 is located adjacent access opening 118. A machine stitch is a much stronger mechanism for attaching fabric together. This way, a carnivorous pet will have more difficulty in reaching the access opening by chewing when the fabric pieces are sewn together at the access opening with a machine stitch.

Figure 10:
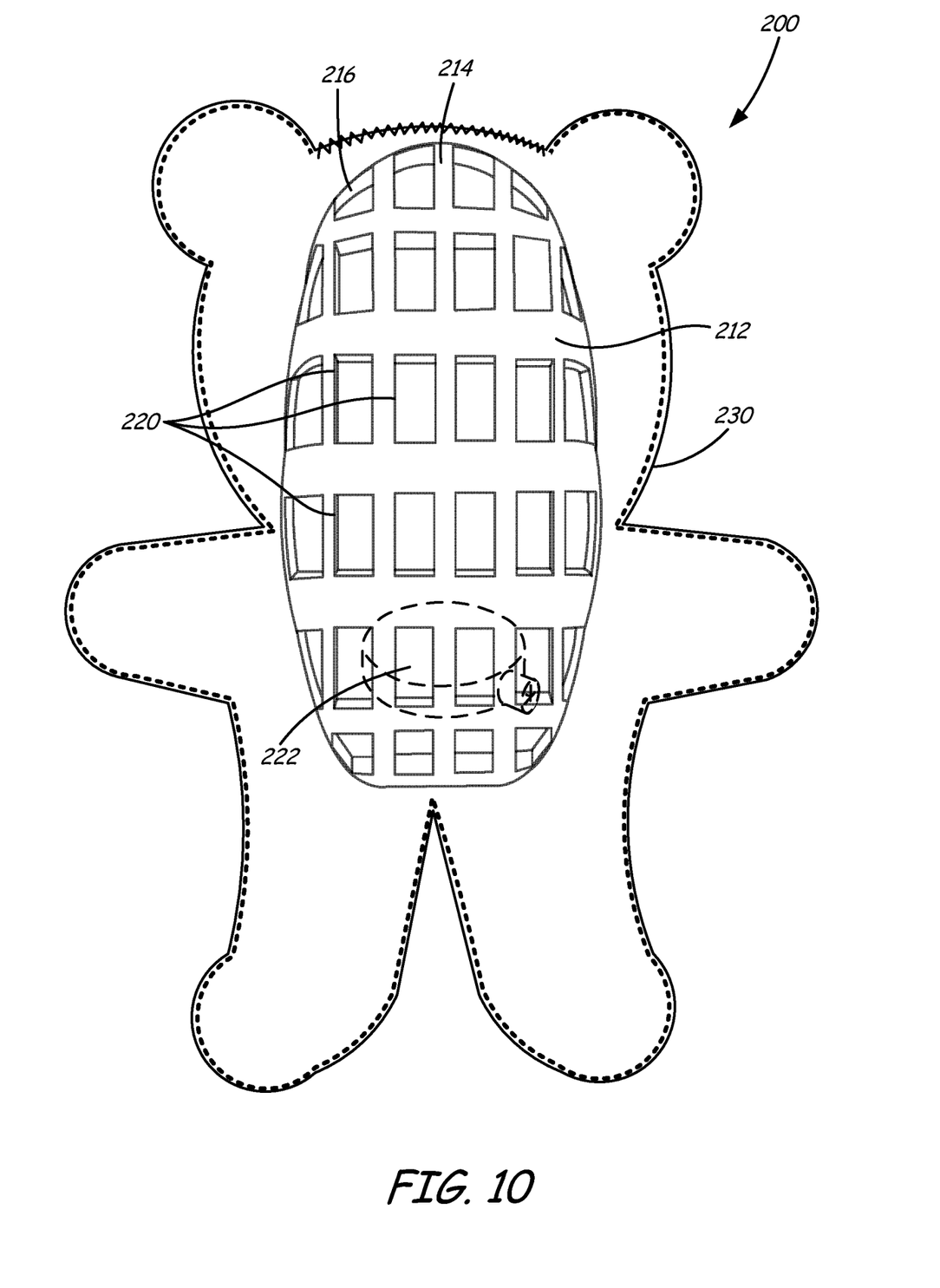
FIG. 10 illustrates a front plan view of a pet toy under another embodiment.
Figure 11:
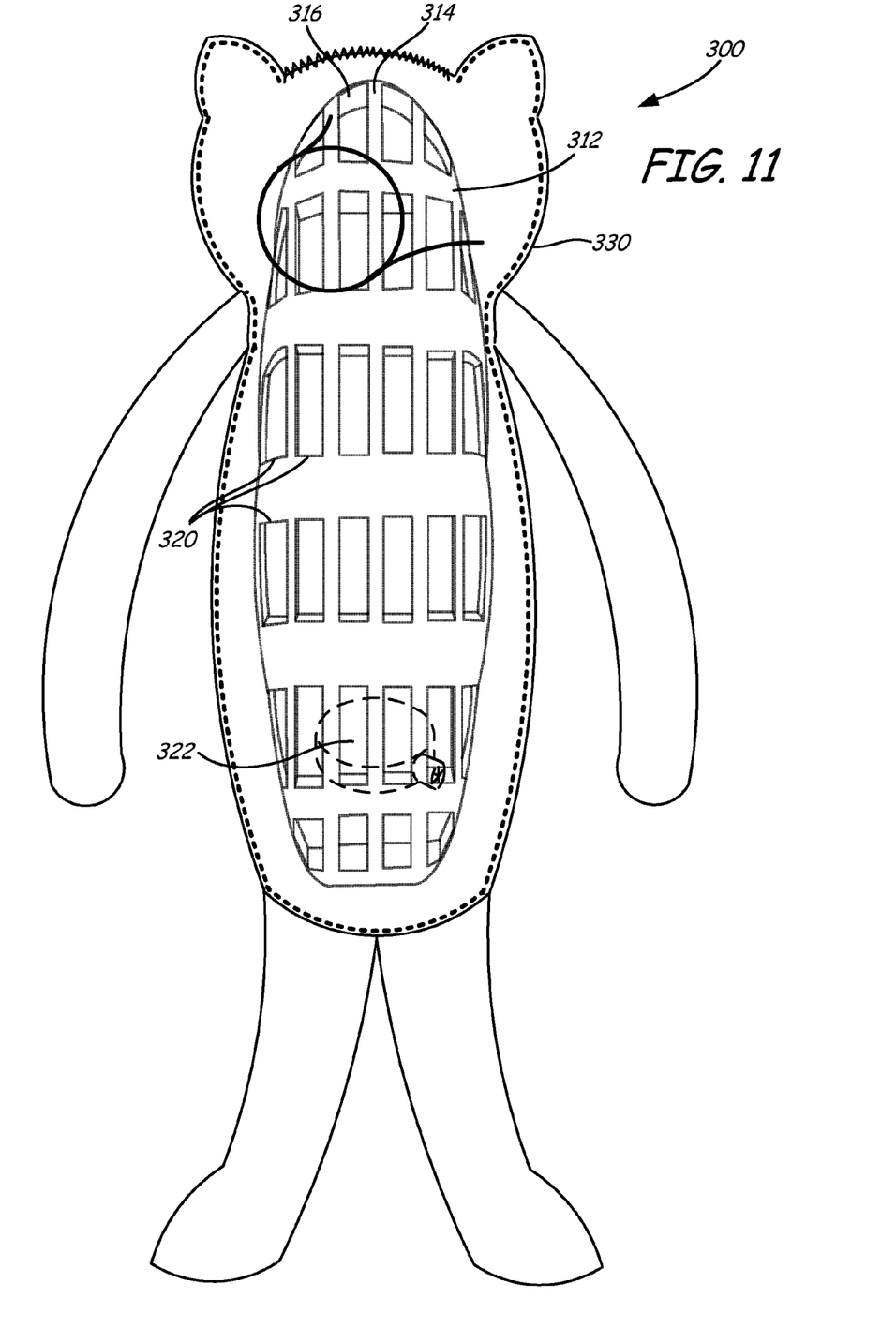
FIG. 11 illustrates a front plan view of a pet toy under yet another embodiment.

FIG. 10 illustrates a front plan view of a pet toy 200 under another embodiment and FIG. 11 illustrates a front plan view of a pet toy 300 under yet another embodiment. As illustrated, internal skeletal members 212 and 312 includes different shapes than internal skeletal member 112 illustrated in the first embodiment. Otherwise, internal skeletal members 212 and 312 include the same components of internal skeletal member 112. For example, internal skeletal members 212 and 312 include outer surfaces 214 and 314, inner surfaces 216 and 316, access openings (hidden from view), sound-emitting squeaker devices 222 and 322 and a plurality of apertures 222 and 322.

In both of the embodiments illustrated in FIG. 10 and FIG. 11, internal skeletal members 212 and 312 are located in the main bodies 230 and 330 of the pet toys 200 and 300 and not in appendages (e.g., 232, 332) of the pet toy. In addition, fabric pieces are secured to other fabric pieces by, for example, stitching. In one embodiment, fabric pieces are secured together around a portion of the periphery of internal skeletal member 212 and 312 with a machine stitch 208, 308 and are secured together around a remaining portion of the periphery of the internal skeletal member 212 and 312 by a hand stitch 210, 310. In particular, machine stitch 210 and 310 is located adjacent an access opening in internal frame members 212 and 312.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pet toy comprising:
   an internal skeletal member comprising:
      an outer surface;
      an inner surface defining an internal space of the internal skeletal member;
      a plurality of apertures extending between the outer surface and the inner surface;
      a plurality of spaced apart intersecting laths defining each aperture, wherein at least a portion of the intersecting laths circumnavigate about the internal space of the internal skeletal member;
      an access opening different than each of the apertures and defined only by one of the plurality of laths that circumnavigates about the internal space of the internal skeletal member;
      wherein the internal skeletal member is configured to deform upon compression such that opposing sides of the internal surface come into contact with each other;
   a sound-emitting squeaker device insertable through the access opening and located within the internal space of the internal skeletal member; and
   an outer covering surrounding the internal skeletal member.

2. The pet toy of claim 1, wherein the outer covering includes at least two fabric pieces comprising one of polyester, nylon, wool, cotton, animal fur, animal hide and courdura.

3. The pet toy of claim 1, wherein the at least two fabric pieces are secured together around a portion of the periphery of the internal skeletal member with a machine stitch and are secured together around a remaining portion of the periphery by a hand stitch, the machine stitch is located adjacent to the access opening of the internal skeletal member.

4. The pet toy of claim 1, wherein the internal skeletal member is further configured to expand back to its original shape when released to resume supporting of the outer covering.

5. The pet toy of claim 1, wherein the internal skeletal member comprises a single, continuous material.

6. A pet toy comprising:
   an internal skeletal member having an inner surface, an outer surface, a plurality of spaced apart longitudinal laths and a plurality of spaced apart lateral laths, wherein the internal skeletal member comprises:
  a plurality of apertures extending between the inner surface and the outer surface and defined by intersecting longitudinal laths and lateral laths;
  an access opening extending between the inner surface and the outer surface and defined by a single one of the longitudinal laths or a single one of the lateral laths;
  wherein the internal skeletal member is configured to deform upon compression such that opposing sides of the internal surface come into contact with each other; and
an outer covering surrounding the skeletal member and including at least two fabric pieces, wherein the at least two fabric pieces are secured together around a portion of a periphery of the internal skeletal member with a machine stitch and are secured together around a remaining portion of the periphery by a hand stitch, the machine stitch being located adjacent to the access opening of the internal skeletal member.

7. The pet toy of claim 6, wherein the at least two fabric pieces comprise one of polyester, nylon, wool, cotton, animal fur, animal hide and courdura.

8. The pet toy of claim 6, further comprising a sound-emitting squeaker device located within an internal space of the internal skeletal member, wherein the sound-emitting squeaker device remains free to move throughout the internal space of the internal skeletal member.

9. The pet toy of claim 8, wherein for the sound-emitting squeaker device is inserted through the access opening into the internal space of the internal skeletal member.

10. The pet toy of claim 6, wherein the internal skeletal member further comprises a plurality of apertures extending between the inner and outer surfaces to form a lattice structure.

11. The pet toy of claim 6, wherein the internal skeletal member is further configured to expand back to its original shape when released to resume supporting of the outer covering.

12. A pet toy comprising:
  an internal skeletal member having an inner surface, an outer surface, a plurality of apertures extending between the inner and outer surfaces, a plurality of spaced apart longitudinal laths and a plurality of spaced apart lateral laths, wherein each longitudinal lath intersects with each lateral lath to define each aperture and thereby form a lattice frame structure; and
  an outer covering surrounding the internal skeletal member;
  wherein the internal skeletal member includes an access opening extending from the inner surface to the outer surface of the internal skeletal member, the access opening defined only by an edge of one of the plurality of longitudinal laths or an edge of one of the plurality of lateral laths.

13. The pet toy of claim 12, wherein the outer covering comprises at least two fabric pieces.

14. The pet toy of claim 13, wherein the at least two fabric pieces are secured together around a portion of the periphery of the internal skeletal member with a machine stitch and are secured together around a remaining portion of the periphery by a hand stitch, the machine stitch is adjacent to the access opening of the internal skeletal member.

15. The pet toy of claim 13, further comprising a sound-emitting squeaker device insertable through the access opening and into an internal space of the internal skeletal member such that the sounding emitting squeaker device is both free to move throughout the internal space and be retained by the internal skeletal member.

16. The pet toy of claim 12, wherein the internal skeletal member is located in a main body of a pet toy.

17. The pet toy of claim 12, wherein the internal skeletal member comprises a single, continuous material.

* * * * *